Sept. 15, 1953
J. D. MOORE ET AL
2,652,526
AIRCRAFT CONTROL SYSTEM
Filed April 12, 1951
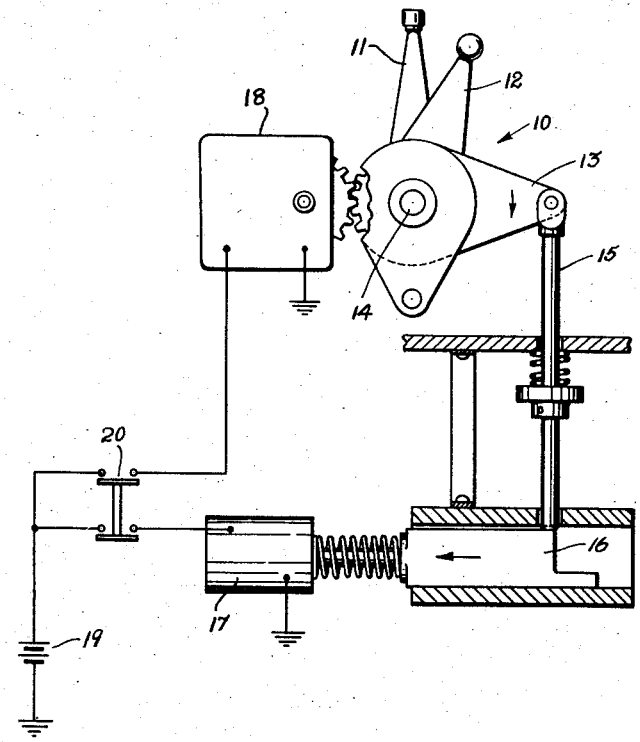
INVENTORS
J.D. MOORE
B.S. WOOD
PER
ATTORNEY Patented Sept. 15, 1953

2,652,526

UNITED STATES PATENT OFFICE 2,652,526

AIRCRAFT CONTROL SYSTEM

John David Moore, Long Branch, Ontario, and Bryan Stevens Wood, Toronto, Ontario, Canada, assignors to A. V. Roe Canada Limited, Malton, Ontario, Canada, a corporation Application April 12, 1951, Serial No. 220,587

1 Claim. (Cl. 318—372)

The invention relates to aircraft control systems.

Vibration in an aircraft will often cause the throttle control levers in the throttle quadrant to "creep" from the position in which they have been set by the pilot and therefore it has become expedient to provide in the quadrant a friction device for adjusting the frictional resistance to movement of the control levers in the quadrant. Under ordinary operating conditions this friction device is adjusted manually by the pilot to meet his own requirements but when control of the throttles is assumed by some remote control system, it becomes essential to render the friction device ineffective, for example with instrument landing systems in which the final approach of an aircraft to a landing field is automatically controlled by radiant energy signals from a radio beam.

The receiving apparatus installed in an aircraft with a system of this sort usually includes a servo-mechanism for regulating, amongst other things, the settings of the throttle control levers. In military aircraft, the bombardier when using his bombsight may also have temporary control of a similar servo-mechanism. Obviously it is essential that the throttle control levers be freely movable if the servo-mechanism is to function properly, and accordingly an apparatus has been developed for quickly releasing the frictional resistance imposed by the friction device on the throttle control levers. An apparatus of this kind is disclosed in Patent No. 2,587,875, assigned to A. V. Roe Canada Limited.

It is equally essential that the friction device releasing apparatus be actuated every time that regulation of the throttle control levers is assumed by the remote control system, and consequently it is the main object of this invention to provide safety means for actuating automatically the friction device releasing apparatus when regulation of the throttle control levers is assumed by the remote control system.

The invention will be more readily understood by reference to the following description of a preferred embodiment thereof; the accompanying drawing which forms a part of this description illustrates, in side elevation, an aircraft throttle quadrant assembly and a control system constructed in accordance with the invention.

The throttle quadrant assembly 10 includes a plurality of manually operable throttle control levers 11, a loading lever 12 which provides means for restraining the free movement of levers 11, and a conditioning lever 13, all of which are rotatably mounted on a shaft 14. To the conditioning lever is connected a rod 15, the lower end of which bears on a slidable stepped block 16 whose position is controlled by the action of a spring-loaded solenoid 17.

The conditioning lever 13, the rod 15, the stepped block 16 and the solenoid 17 constitute a release apparatus for releasing the loading lever 12 from the levers 11.

The remote control system comprises an apparatus 18 which includes a radio receiver adapted to translate radiant energy signals from a ground transmitter into electrical impulses utilized for controlling a bank of servo-mechanisms. These servo-mechanisms are linked to the throttle control levers 11 through a clutch mechanism so that the throttle control levers are released when the control apparatus 18 is not in use. A source 19 of electrical energy is connected to the apparatus 18 and to the solenoid 17 in parallel by an electrical circuit which includes a double pole switch 20 so arranged that the control apparatus and the solenoid will be activated simultaneously when the switch is closed.

Under normal operating conditions the throttle control levers 11 are free to rotate on the shaft 14 independently of the servo-mechanisms, frictional resistance to their movement being applied, as desired, by the loading lever 12. When the remote control system is to be used, the switch 20 is closed thereby energizing the control apparatus 18 and the solenoid 17 simultaneously. Energization of the solenoid causes withdrawal of the stepped block 16 (to the left, in the drawing) so that the rod 15 drops down; this actuates the release apparatus and the friction theretofore imposed by the loading lever 12 being released, the throttle control levers are then free to respond, without restriction, to regulation by the servo-mechanisms in the control apparatus 18.

It will be understood that the form of the invention herewith shown and described is to be taken as a preferred example of the same and that various changes may be made in the shape, size and arrangement of the parts without departing from the spirit of the invention or the scope of the subjoined claim.

What we claim as our invention is:

A control system for remote operation of a manually operable lever, the lever having restraining means coupled thereto for restraining free movement of the lever, said system comprising remotely controllable apparatus adapted when activated to operate the lever, switch means for activating the remotely controllable apparatus, and releasing means coupled to the restraining means and actuated by the switch means for releasing the restraining means from the lever.

JOHN DAVID MOORE.
BRYAN STEVENS WOOD.

References Cited in the file of this patent

UNITED STATES PATENTS

| Number | Name | Date |
|---|---|---|
| 1,477,480 | Groene | Dec. 11, 1923 |
| 1,772,788 | Sperry | Aug. 12, 1930 |
| 2,385,203 | Hanna et al. | Sept. 18, 1945 |
| 2,429,642 | Newton | Oct. 28, 1947 |